United States Patent [19]
Kihara et al.

[11] 3,964,095
[45] June 15, 1976

[54] VIDEO RECORDING AND/OR REPRODUCING APPARATUS

[75] Inventors: Nobutoshi Kihara; Osamu Shimada, both of Tokyo, Japan

[73] Assignee: Sony Corporation, Tokyo, Japan

[22] Filed: July 3, 1974

[21] Appl. No.: 485,549

[30] Foreign Application Priority Data
July 11, 1973 Japan................................ 48-78600

[52] U.S. Cl................................. 360/81; 271/172; 360/2; 360/84
[51] Int. Cl.²...................... G11B 5/52; G11B 5/80; G11B 21/04
[58] Field of Search.................. 360/84, 2, 136, 81; 271/172; 209/82

[56] References Cited
UNITED STATES PATENTS

| | | | |
|---|---|---|---|
| 2,915,596 | 12/1959 | Lyon et al.............................. | 360/81 |
| 3,629,515 | 12/1971 | Dolby................................... | 360/84 |

FOREIGN PATENTS OR APPLICATIONS

| | | | |
|---|---|---|---|
| 873,719 | 7/1961 | United Kingdom.................. | 271/172 |

*Primary Examiner*—Alfred H. Eddleman
*Attorney, Agent, or Firm*—Lewis H. Eslinger; Alvin Sinderbrand

[57] ABSTRACT

An apparatus for recording and/or reproducing video signal information employs, as a record medium, a sheet assembly composed of at least two normally closely adjacent, confronting flexibly resilient sheets which provide mutual protection, when in that relation, for video signal information recorded, for example, magnetically, on at least one of the sheets. The recording and/or reproducing apparatus has a separator device which slidably receives the sheet assembly and separates or spreads apart substantial portions of the sheets, and the separated portion of each sheet which is adapted to have signal information recorded thereon is directed by respective sheet guides from the separator device in an arcuate path about a respective guide drum which has associated rotary transducers, for example, magnetic heads, so that, when the sheet assembly and the guide drum and transducers are moved relative to each other in the direction of the drum axis, for example, by displacement of the separator device and sheet guides, as a unit, relative to the guide drum, the rotary transducers scan successive parallel record tracks on the portion of sheet about the drum. Preferably, in recording video signal information on one of the sheets, the rate of movement of the sheet assembly relative to the respective drum and rotary transducers is selected so that there are no guard bands or gaps between the successive parallel tracks for enhancing the utilization of the sheet for recording purposes.

When audio signal information is also to be recorded on, and reproduced from another of the sheets of the sheet assembly, the separated portion of such other sheet is also directed from the separator device about another guide drum having rotary transducers associated therewith, and the latter transducers are preferably rotated at a slower speed than the transducers for recording and/or reproducing the video signal information so that the transducers for recording and/or reproducing the audio signal information will scan spaced apart, parallel record tracks on the respective sheet portion.

20 Claims, 24 Drawing Figures

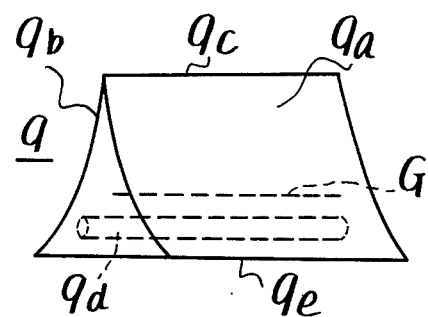
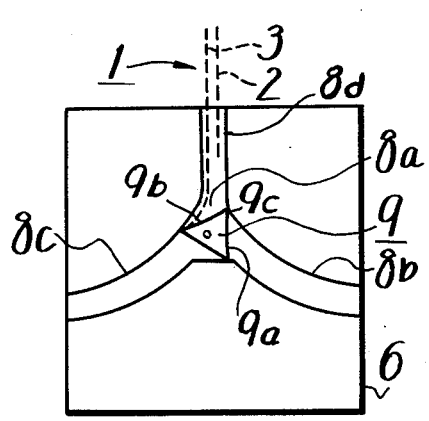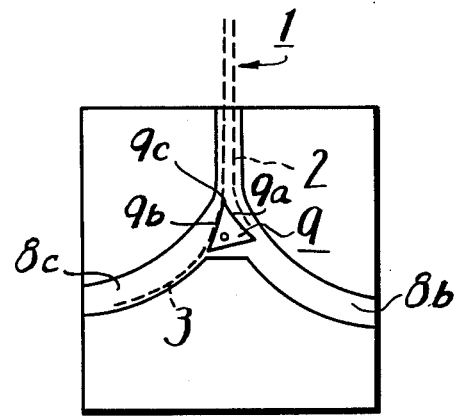
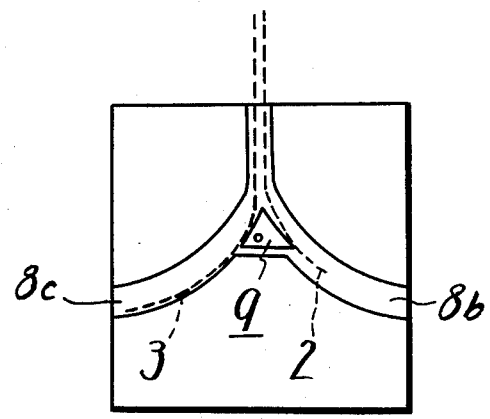

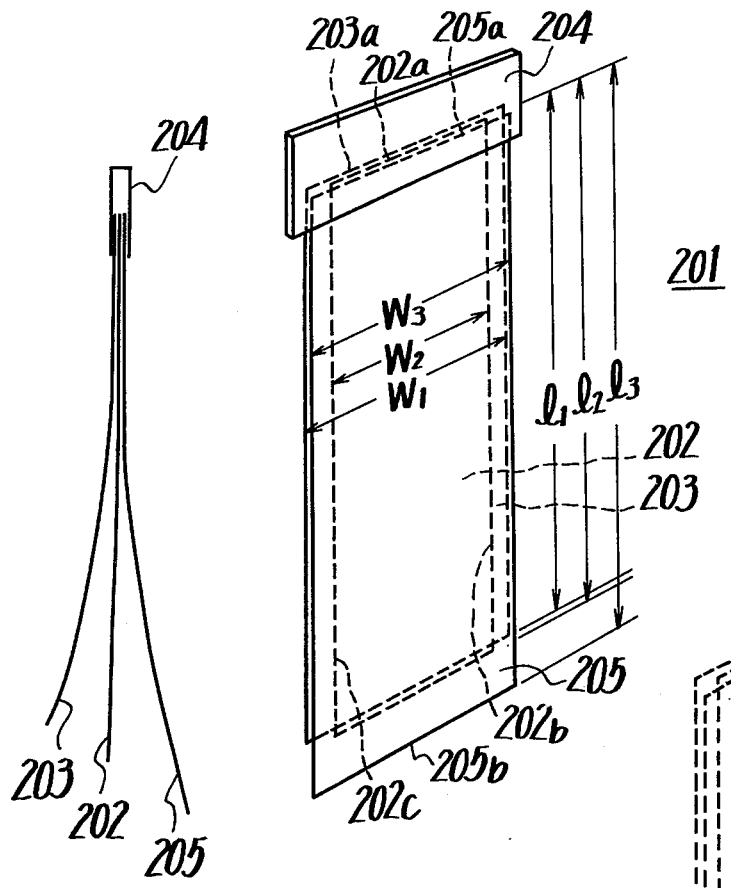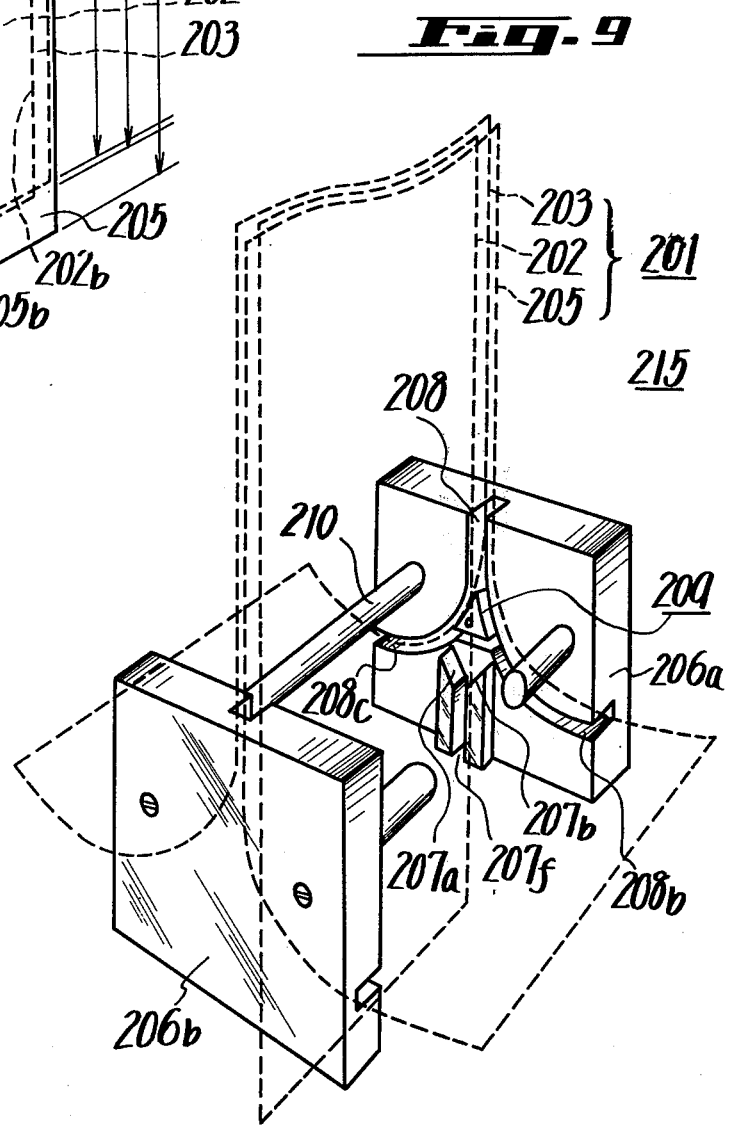

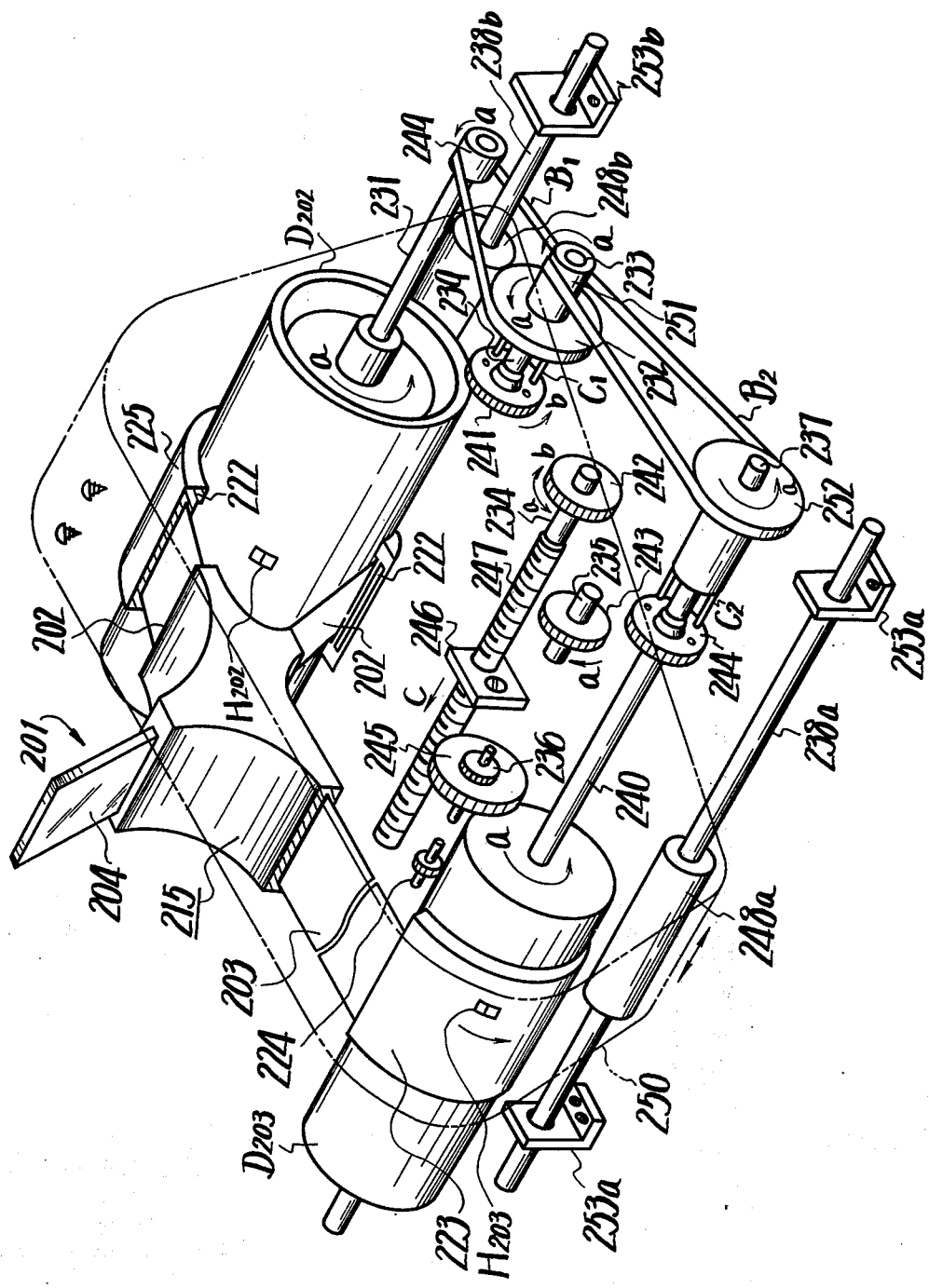

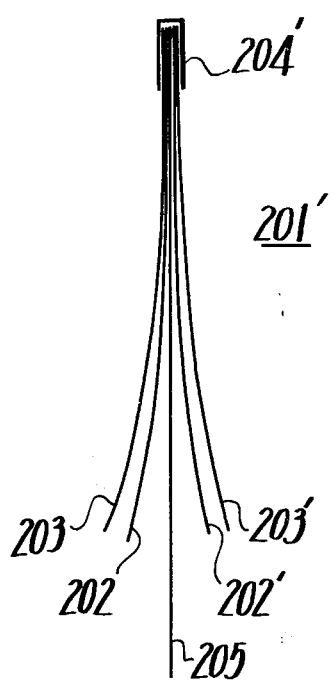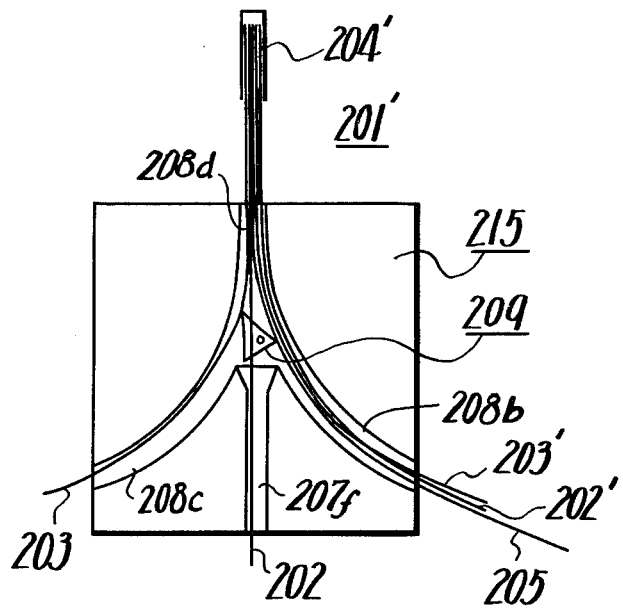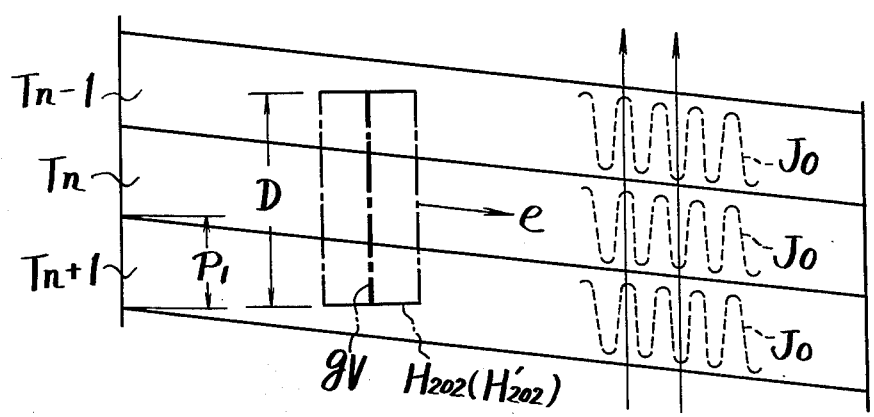

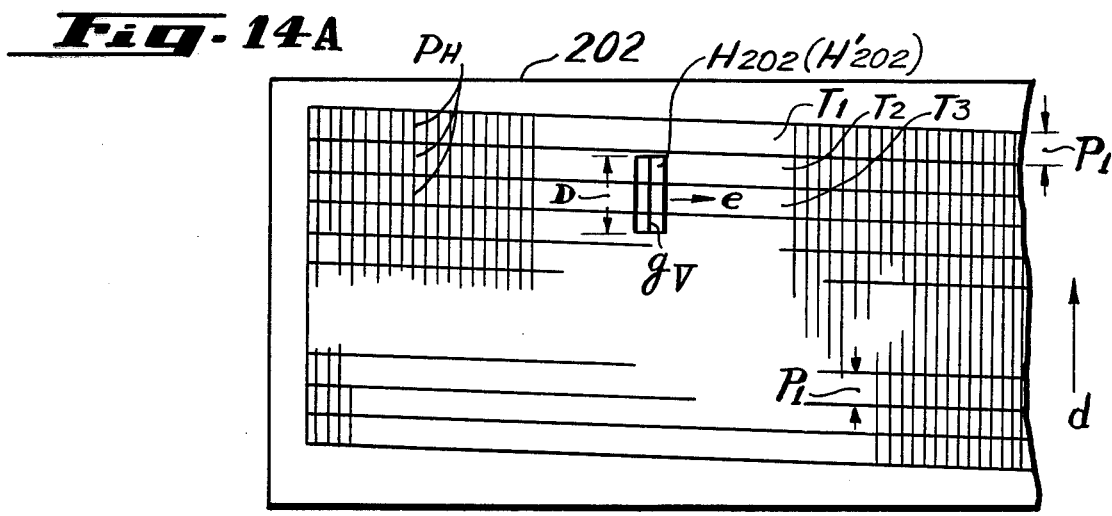
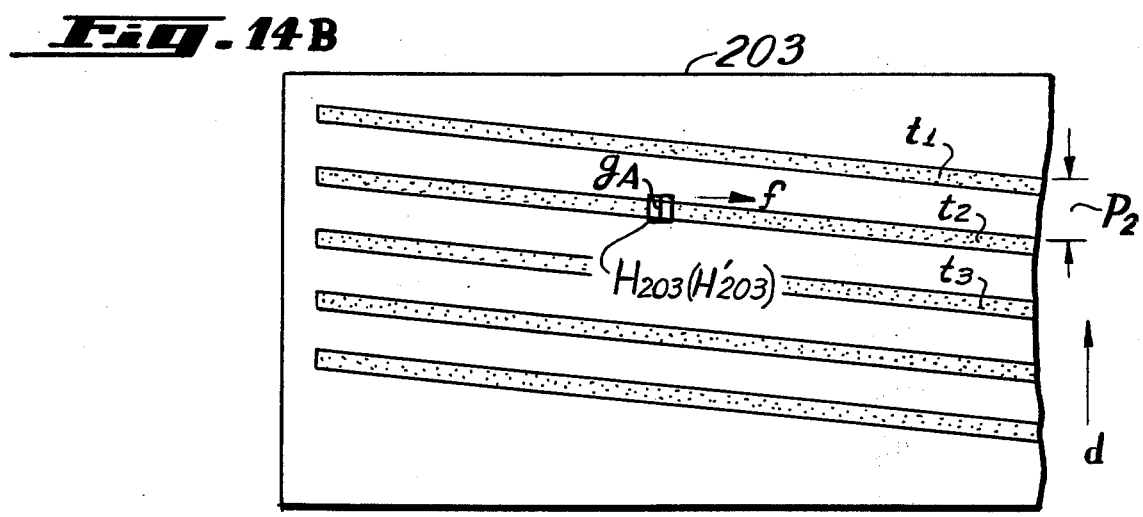
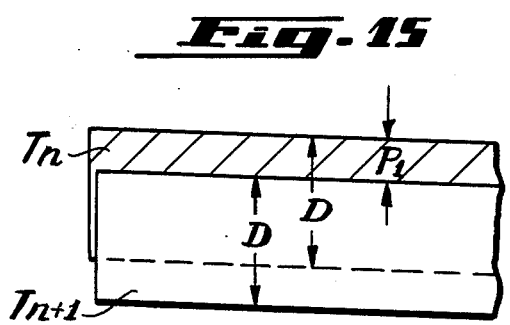

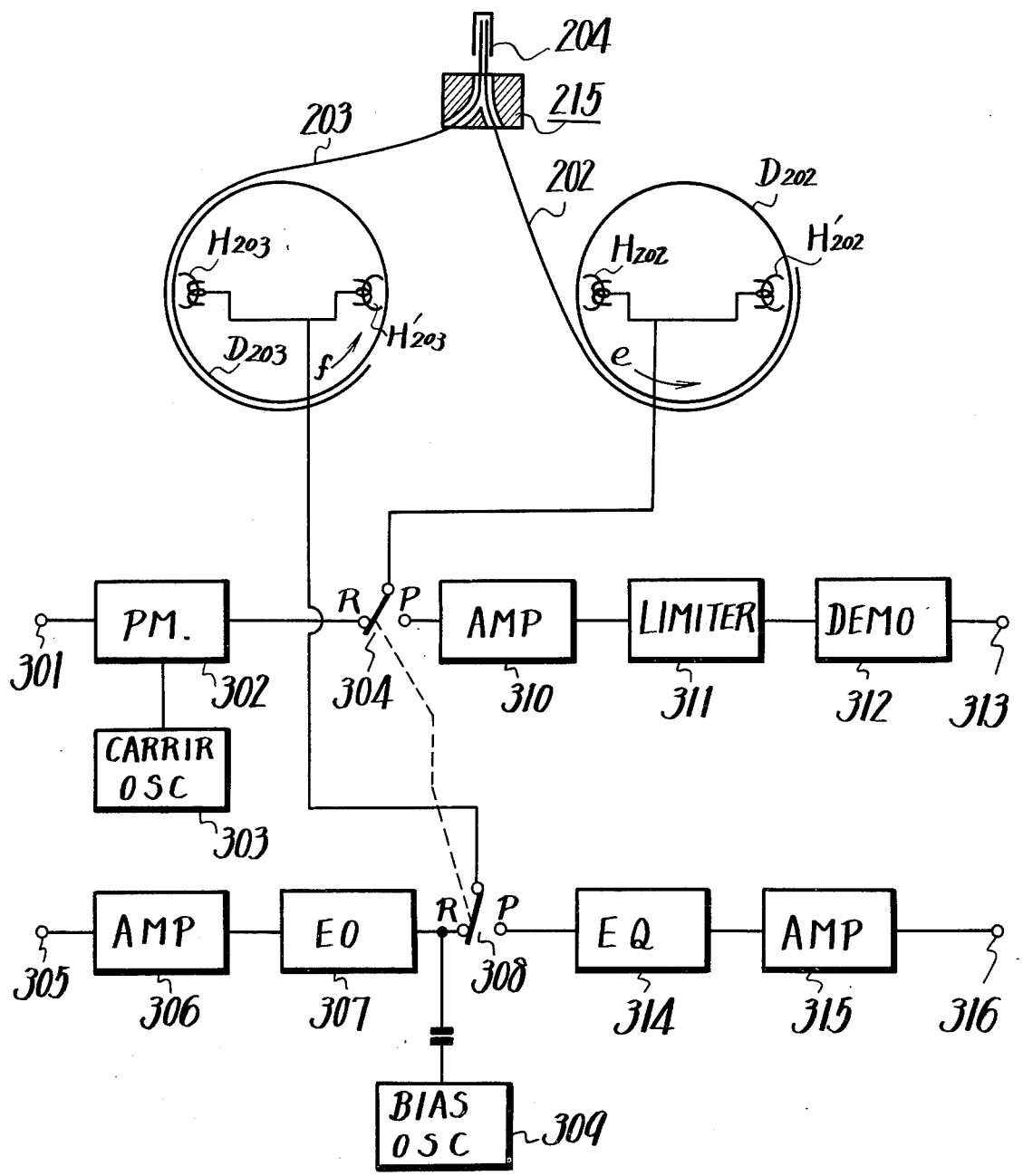

VIDEO RECORDING AND/OR REPRODUCING APPARATUS

BACKGROUND OF THE INVENTION

1. Field of the Invention

This invention relates generally to an apparatus for recording and/or reproducing at least video signal information on a record sheet, and more particularly is directed to a recording and/or reproducing apparatus of the type in which signal transducers are mounted for rotation in a circular path transverse to the direction of movement of the record sheet, whereby such video signal information is recorded on and/or reproduced from the sheet in a series of parallel record tracks.

2. Description of the Prior Art

Conventional apparatus for recording and/or reproducing video signals, that is, a video tape recorder (hereinafter referred to as VTR), has employed a magnetically coated recording tape which is wound on at least one reel and which is transported from such reel in a helical path about the circular path of rotation of magnetic heads or transducers so that the latter record and/or reproduce video signal information in parallel record tracks extending obliquely across the tape. However, the reel or reels having the tape wound thereon are bulky and relatively heavy, and thus are inconvenient for transportation and storage thereof. Further, when it is desired to record or reproduce signals on a portion of the tape intermediate its ends, it is necessary to either unwind or rewind the tape on the supply reel in order to gain access to the desired portion of the tape, and such unwinding or rewinding is time consuming. If such wasted time is to be reduced for example, by providing fast forward and rewind operating modes, the apparatus becomes undesirably complicated. The described existing apparatus is also disadvantageous in that special operations are required for still- or slow-motion reproduction, and reproduction of the signals recorded in the successive oblique tracks cannot be effected in the reverse order.

The existing VTR employing magnetic tape as the recording medium, as described above, requires a highly accurate servo system for ensuring that the transducers accurately scan the record tracks during recording and/or reproducing operations. In cases where the magnetic tape is contained in a cassette, relatively complex mechanisms are required for withdrawing the tape from the cassette housing and training the withdrawn tape about the usual guide drum associated with the rotary heads or transducers. Finally, in the case of video signals recorded on magnetic tape, as aforesaid, the mass reproduction of the recorded tapes is difficult and expensive.

It has been proposed, for example, in U.S. Pat. No. 2,915,596, issued Dec. 1, 1959, to record and/or reproduce intelligence or information on a sheet of paramagnetic material in an apparatus that comprises a cabinet provided with an interiorly directed, semi-cylindrical guide channel into which the sheet is insertable in the direction of curvature of the channel so as to engage a straight margin of the sheet with an abutment extending parallel to the longitudinal axis of the semi-cylindrical channel for guiding the sheet in its slidable movement within the channel parallel to that axis by means of a rotated drive roller extendable into the channel. Rotary magnetic transducers or heads are moved in a circular path that substantially coincides with the curvature of the channel for recording or reproducing signals on the sheet therein, with the slidable movement of the sheet and the rotary movement of the transducers combining to cause the transducers to scan spaced-apart, parallel record tracks on a portion of the sheet. The foregoing arrangement is disclosed specifically only for the magnetic recording and reproducing of sound and is suitable, if at all, only for that purpose. If an attempt is made to employ the apparatus disclosed in U.S. Pat. No. 2,915,596 for recording and/or reproducing video signal information, the spaced-apart relation of the successive record tracks and the consequent poor utilization of the sheet area for the recording of signal information results in a relatively short playing time for each sheet. Further, the existing apparatus, as aforesaid, is incapable of simultaneously recording and/or reproducing both video signal information and associated audio signal information. It is also apparent that the sheets employed individually in the existing apparatus have their para-magnetic coatings exposed to damage when not in use, particularly after recording, and further that such sheets are susceptible to creasing when not in use or when being inserted into the apparatus, particularly if formed of desirably thin film material.

SUMMARY OF THE INVENTION

Accordingly, it is an object of this invention to provide a video recording and/or reproducing apparatus wherein video signal information is recorded on a recording sheet by rotating transducer means.

Another object is to provide an apparatus, as aforesaid, with means to feed the sheet in a direction parallel to a margin of the sheet and to move transducer means in a transverse direction with respect to such movement of the sheet.

Still another object of this invention is to provide a video recording and/or reproducing apparatus, wherein rotating transducer means scan a recording sheet which is moved in a direction at substantially right angles to the path of the transducer means, and wherein the recording sheet may be inserted into, or moved from the apparatus in a direction other than the normal path of travel of said sheet.

A further object of this invention is to provide an apparatus, as aforesaid, wherein a recording sheet is scanned by a transducing means to provide a series of transverse record tracks with continuously recorded signal information thereon.

Still another object is to provide an apparatus, as aforesaid, wherein a recording sheet is held firmly in a semi-cylindrical configuration during its transverse movement relative to the path of the transducer means.

A still further object is to provide a video recording and/or reproducing apparatus, wherein a sheet separator is used to separate a video recording sheet from a leader sheet, which is normally in overlapping relation to the video recording sheet so as to serve as a protector or holder therefor, and guides are provided to direct the separated video recording sheet around rotating transducer means.

Still another object of this invention is to provide a video and audio recording and/or reproducing apparatus, wherein a sheet separator is used to separate video and audio recording sheets which are normally in overlapping or confronting relation, and the separated video and audio recording sheets are guided about rotating video transducer means and rotating audio transducer means, respectively.

It is still a further object of this invention to provide a recording medium, preferably in the form of a sheet assembly, adapted to have video signal information, and preferably also audio signal information, recorded thereon, and which is compact, light in weight, and not easily damaged in normal use, and which is further capable of the high speed reproduction of large numbers of copies.

In accordance with an aspect of this invention, an apparatus for recording and/or reproducing video signal information employs, as a record medium, a sheet assembly composed of at least two normally closely adjacent, confronting or overlapped flexibly resiliient sheets at least one of which is adapted to have video signal information recorded thereon, for example, magnetically. Further, one of the sheets of the sheet assembly preferably is less flexible than the other sheets so as to function as a leader during the spreading apart or separation of the sheets for the recording and reproducing operations. The sheets are preferably of different sizes, for example, of different widths or lengths, so that a separator device of the apparatus which slidably receives the sheet assembly can detect the size differences for separating at least major portions of the sheets from each other. Upon such separation of the sheets, each sheet which is adapted to have signal information recorded thereon has its separated portion directed by respective sheet guides in an arcuate path about a respective guide drum which has associated rotary transducers, for example, magnetic heads, so that, when the sheet assembly and the rotary transducers are moved relative to each other in the direction of the axis of rotation of the transducers, for example, by displacement of the separator device and sheet guides, as a unit, relative to the guide drum and transducers, the rotary transducers scan successive parallel record tracks on the portion of the sheet about the drum.

It is a feature of this invention that, in recording video signal information on at least one of the sheets of the sheet assembly, the rate of movement of the sheet assembly relative to the rotary transducers in the direction of the axis of the latter is selected in relation to the rotary speed of the transducers so that there are no guard bands or gaps between the successive parallel record tracks for enhancing the utilization of the sheet for recording purposes, with the recording method involving phase modulation, for example, as disclosed in U.S. patent application Ser. No. 425,845, filed Dec. 18, 1973, and having a common assignee herewith, so that beat interference between signals reproduced from adjacent record tracks is avoided even though such tracks do not have gaps or guardbands therebetween and even though a tracking servo system is not provided.

When audio signal information is also to be recorded on, or reproduced from another sheet of the sheet assembly, which other sheet may be the relatively less flexible leader sheet or a sheet in addition to the latter, the separated portion of such other sheet is directed from the separator device about another guide drum having rotary audio recording and/or reproducing transducers associated therewith, and the audio transducers are preferably rotated at a slower speed than the video recording and/or reproducing transducers so that the audio signal information is recorded in parallel tracks which are spaced apart on the respective sheet.

The above, and other objects, features and advantages of the invention, will be apparent in the following detailed description of illustrative embodiments which is to be read in connection with the accompanying drawings.

BRIEF DESCRIPTION OF THE DRAWINGS

FIG. 3 is an enlarged perspective view of one of the sheet directing members included in the separator device of FIG. 2;

FIGS. 4A, 4B and 4C are a series of diagrammatic cross-sectional views illustrating successive stages in the operation of the separator device of FIG. 2;

FIGS. 8A and 8B are respectively a perspective view and a longitudinal sectional view of a recording sheet assembly according to still another embodiment of this invention;

FIG. 9 is a perspective view similar to that of FIG. 2, but showing a separator device for use with a sheet assembly of the type shown on FIGS. 8A and 8B;

FIG. 12 is a schematic, exploded perspective view of a recording and/or reproducing apparatus according to the embodiment of this invention represented by FIG. 11;

FIG. 13A is a longitudinal sectional view of a recording sheet assembly according to still another embodiment of this invention;

FIG. 13B is a view similar to that of FIG. 13A, but showing the manner in which a separator device similar to that illustrated on FIG. 9 is employed for selectively spreading apart or separating the recording sheets of the assembly shown on FIG. 13A;

FIGS. 14A and 14B are enlarged diagrammatic views illustrating the record tracks in which video signal information and audio signal information are recorded on the respective recording sheets according to this invention;

FIG. 15 is a diagrammatic view to which reference will be made in explaining the method by which video signal information is recorded in accordance with this invention;

FIG. 16 is a diagrammatic view illustrating video and audio signal recording and reproducing circuits of an apparatus according to this invention; and FIG. 17 is an enlarged diagrammatic view to which reference will be made in explaining the preferred video signal recording method employed in the apparatus according to this invention.

DESCRIPTION OF THE PREFERRED EMBODIMENTS

Figure 1:
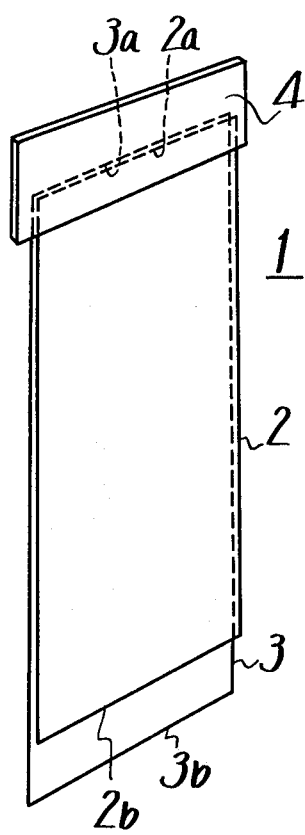
FIG. 1 is a perspective view showing a sheet assembly for recording video and audio signal information according to one embodiment of this invention.

Referring to the drawings in detail, and initially to FIG. 1 thereof, it will be seen that a record medium in accordance with this invention for the recording and reproducing of at least video signal information may be in the form of a sheet assembly 1 comprising a video signal recording sheet 2, an audio signal recording sheet 3 which may also serve as a leader, and a stopper member 4 by which sheets 2 and 3 are fastened or permanently held together adjacent ends 2a and 3a of sheets 2 and 3. Sheets 2 and 3 are preferably of oblong configuration, for example, rectangular as shown, and are formed of flexibly resilient material, such as, the plastic sheet or film material available under the tradename Mylar from E. I. DuPont Company. The sheets 2 and 3 are normally flat so as to be disposed in closely adjacent, confronting or overlapping relation, as shown on FIG. 1, and the sheet 3 which is adapted to have audio signal information recorded thereon is, in the embodiment of the invention presently being described, preferably less flexible than sheet 2 so as to also function as a leader for the sheet assembly 1, as hereinafter described in detail.

In order to adapt sheets 2 and 3 for the recording thereon of video signal information and audio signal information, respectively, surfaces of such sheets, and preferably the surfaces thereof which are in confronting relation when sheets 2 and 3 are closely adjacent each other, may have suitable magnetic coatings thereon so that such magnetic coatings are protected by the sheets 2 and 3 in the normal, overlapping relation thereof.

In accordance with this invention, sheets 2 and 3 are of different sizes, for example, as shown on FIG. 1, sheet 3 may be longer than sheet 2 so that, in the normal closely adjacent, confronting relation of the sheets, the free end portion 3b of the relatively less flexible sheet 3 will project beyond the adjacent free end 2b of sheet 2.

Figure 5:
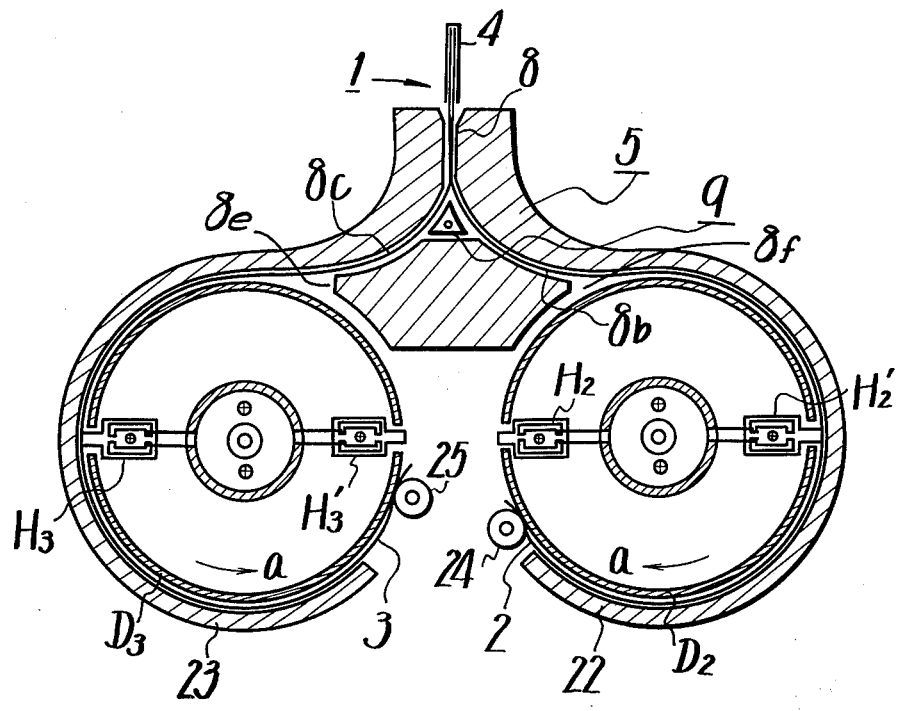
FIG. 5 is a schematic cross-sectional view of a recording and/or reproducing apparatus which includes the separator device of FIG. 2, and which is shown with the separated sheets of the recording sheet assembly of FIG. 1 guided about respective guide drums and associated rotary transducers for the recording or reproducing of video and audio signal information on such sheets.

Referring now to FIG. 5, it will be seen that a recording and/or reproducing apparatus according to this invention which is adapted to be employed with the record medium or sheet assembly 1 of FIG. 1 generally comprises a separator device 5 which slidably receives sheet assembly 1 and spreads apart the free ends 2b and 3b of sheets 2 and 3 so that substantial portions of the sheets are separated from each other, a guide drum for each of the sheets of assembly 1 adapted to have signal information recorded thereon, for example, a guide drum $D_2$ for the sheet 2 adapted to have video signal information recorded thereon and a guide drum $D_3$ for the sheet 3 adapted to have audio signal information recorded thereon, sheet guides 22 and 23 associated with the drums $D_2$ and $D_3$, respectively, for receiving the separated portions of sheets 2 and 3 from separator device 5 and for guiding the respective separated portions of the sheets in arcuate paths about at least portions of the circumferences of the respective drums, and rotary signal transducers, for example, magnetic heads $H_2$ and $H'_2$ associated with guide drum $D_2$ and magnetic heads $H_3$ and $H'_3$ associated with guide drum $D_3$, for movement in circular paths substantially coinciding with the circumferences of the respective drums so that, when the sheet assembly 1 and the rotary signal transducers are moved relative to each other in a direction transverse to the paths of the rotary signal transducers, as hereinafter described in detail, the rotary signal transducers or heads will scan successive parallel record tracks on the separated portions of sheets 2 and 3 disposed in the arcuate paths about drums $D_2$ and $D_3$.

Figure 2:
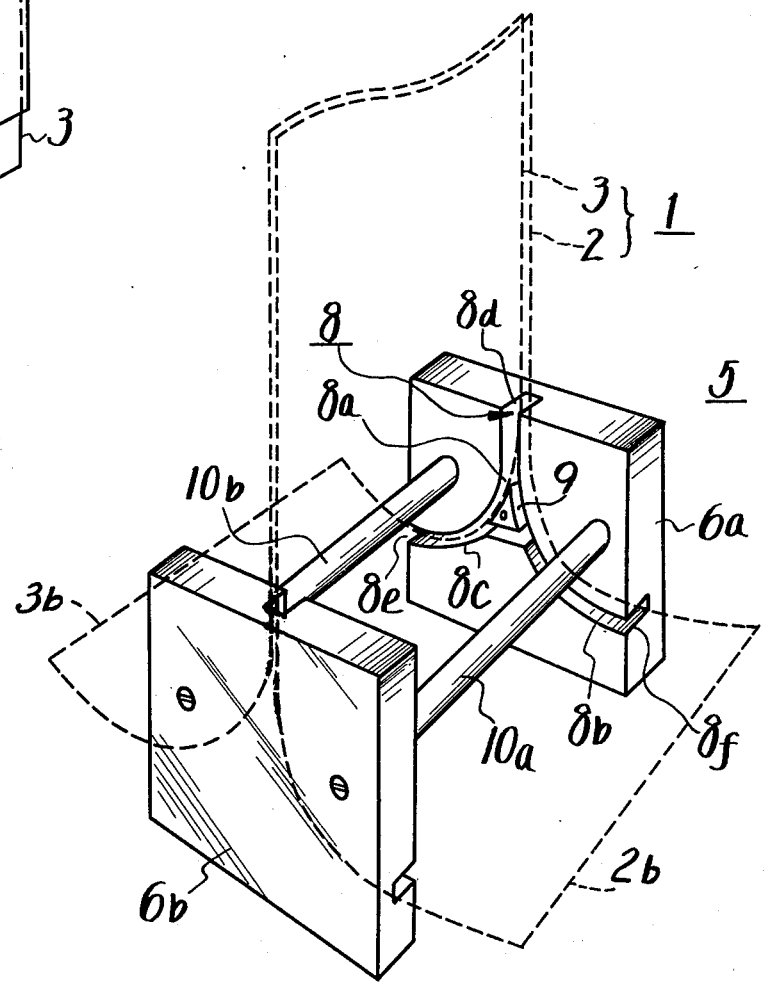
FIG. 2 is a scehmatic perspective view showing a separator device for separating the sheets of the assembly shown on FIG. 1.

As shown particularly on FIG. 2, the separator device 5 of the recording and/or reproducing apparatus according to this invention for use with the record medium or sheet assembly 1 may comprise a pair of similar side members 6a and 6b held in parallel, spaced apart relation by spacer rods 10a and 10b, and having their inner or confronting surfaces formed with respective sheet-guiding channels or grooves 8. Each of the grooves 8 includes an entry portion 8d opening at an edge of the respective side member 6a or 6b, for example, at the top edge of the latter, and leading to a flaring portion 8a from which arcuate branching portions 8b and 8c diverge so as to open at the opposite side edges of the respective member 6a or 6b, as at 8f and 8e, respectively. The distance between side members 6a and 6b is selected in relation to the width of sheets 2 and 3 so that the opposite side edge portions of the sheets, at the free ends of the latter, can be slidably introduced into entry portions 8d of the respective channels or grooves 8. As the side edge portions of sheets 2 and 3 are slidably moved through channels 8, it is intended that sheet 3 will have its side edge portions directed into branching channel portions 8c of the respective channels 8 while sheet 2 will have its opposite side edge portions directed into branching channel portions 8b, whereby to progressively spread apart or separate sheets 2 and 3 beginning at the free ends 2b and 3b thereof. In order to thus direct sheets 2 and 3 into branching channel portions 8b and 8c, respectively, separator device 5 is further shown to include a sheet directing member 9 movably mounted in the flaring portion 8a of each channel 8 between entry portion 8d and branching portions 8b and 8c for initially directing the respective side edge portion of the longer sheet 3 into and along the respective branching portion 8c and then directing the respective side edge portion of the other sheet 2 along the branching portion 8b.

Referring specifically to FIG. 3, it will be seen that each sheet directing member 9 may be of substantially triangular configuration so as to have opposite flanks 9a and 9b leading from an apex 9c to respective lower edges 9e. Each triangular directing member 9 is pivotally mounted, as on a pivot pin 9d, within the respective flaring portion 8a of the groove 8, and is yieldably urged, as hereinafter described, so that the apex 9c normally bears against the side of entry portion 8d remote from branching portion 8c and with the flank 9b of the directing member extending into branching portion 8c, as shown on FIG. 4A. The yieldable urging of each directing member 9 to the position shown on FIG. 4A may be effected gravitationally, for example, by disposing the axis of its pivot 9d below the center of gravity of member 9, indicated at G on FIG. 3, and at a position that is spaced laterally from such center of gravity in the direction toward flank 9b.

It will be apparent that, with sheet directing member 9 in its initial position shown on FIG. 4A, channel portion 8b is effectively closed so that, upon initial insertion of sheet assembly 1 into entry portion 8d of each groove or channel, the projecting free end portion 3b of the relatively less flexible sheet or leader 3 will come in contact with flank 9b and be directed thereby into branching channel portion 8c. By reason of the resilience and reduced flexibility of leader sheet 3, the latter in moving into branching channel portion 8c will assume the largest possible radius of curvature and thereby act against flank 9b of directing member 9 for pivoting the latter in the counterclockwise direction to the position shown on FIG. 4B, in which the apex 9c of sheet directing member 9 is moved to an intermediate position in the respective groove and bears against sheet 3. Thereafter, as the insertion of sheet assembly 1 continues, apex 9c of each directing member 9 peels sheet 2 away from sheet 3 and flank 9a directs sheet 2 into branching channel portion 8b (FIG. 4C).

From the above, it will be apparent that the provision of the relatively longer sheet 3 with less flexibility than sheet 2 serves to both protect sheet 2 against creasing or other damage when the sheets are in their normal closely adjacent, confronting relation, and to ensure that the projecting free end portion 3b of sheet 3 will be effective to actuate each sheet directing member 9, as described above, when the sheet assembly is slidably inserted in separator device 5.

As the free ends of sheets 2 and 3 exit from openings 8f and 8e, respectively, of the branching channel portions 8b and 8c of separator device 5, such free end portions of sheets 2 and 3 are directed about guide drums $D_2$ and $D_3$ by the sheet guides 22 and 23, respectively, which are fixed relative to separator device 5 and movable with the latter, as a unit, relative to guide drums $D_2$ and $D_3$ in directions parallel to the axes of such drums. Further, pressure rollers 24 and 25 (FIG. 5) may be provided adjacent drums $D_2$ and $D_3$, respectively, for urging the free end portions of sheets 2 and 3 against the drums upon the full insertion of sheet assembly 1 into separator device 5, for example, as determined by the engagement of stopper member 4 with the top surfaces of the side members 6a and 6b of the separator device.

Upon the rotation of drums $D_2$ and $D_3$ in the directions of the arrows a on FIG. 5, that is, in the directions in which sheets 2 and 3 extend about the drums from separator device 5, air is frictionally drawn between each of the sheets 2 and 3 and the respective drum surface to provide an air layer therebetween, except at the free end of each sheet where it is pressed against the drum surface by the pressure roller 24 or 25. The signal transducers or heads $H_2$ and $H'_2$ rotate with drum $D_2$ so as to alternately engage slidably with the portion of sheet 2 wrapped about drum $D_2$. Similarly, the signal transducers or heads $H_3$ and $H'_3$ rotate with drum $D_3$ so as to alternately engage slidably with the portion of sheet 3 wrapped about drum $D_3$. In response to the movement of separator device 5 and guides 22 and 23 parallel to the axes of drums $D_2$ and $D_3$, that is, transverse to the paths of rotation of the signal transducers or heads, each pair of rotary transducers or heads scans successive, parallel record tracks on the respective sheet 2 or 3, with the pitch of adjacent tracks, that is, the distance between their parallel center lines, being determined by the speed of rotation of the respective pair of heads.

In the embodiment of the present invention described above with reference to FIGS. 1–5, the sheets 2 and 3 differ in size in respect to the lengths thereof, and the separator device 5 detects the difference in the lengths of sheets 2 and 3 as the means for separating the latter. However, the sheets of a record medium or sheet assembly according to this invention may differ in width so that the wider one of the sheets projects laterally beyond another of the sheets at the opposite sides of the latter, in which case, the separator device adapted to receive such record medium or sheet assembly detects the difference in width of the sheets as the means by which the latter are spread apart or separated. More specifically, as shown on FIG. 6, a record medium or sheet assembly 101 according to this invention is shown to include flexibly resilient sheets 102 and 103 which are respectively adapted to have video signal information and audio signal information recorded thereon, and which are permanently held together at their ends 102a and 103a by means of a stopper member 104 in the same manner as in the previously described sheet assembly 1. The sheets 102 and 103 are oblong and preferably substantially rectangular, with the lengths of sheets 102 and 103 being equal, while their widths are different so that the side edge portions 103b and 103c of sheet 103 project laterally beyond the adjacent side edges 102b and 102c of sheet 102. As before, sheets 102 and 103 are normally in closely adjacent, confronting relation, as shown, so as to mutually protect the magnetic coatings which are preferably provided on their inner surfaces for receiving the respective recorded signal information.

Figure 7:
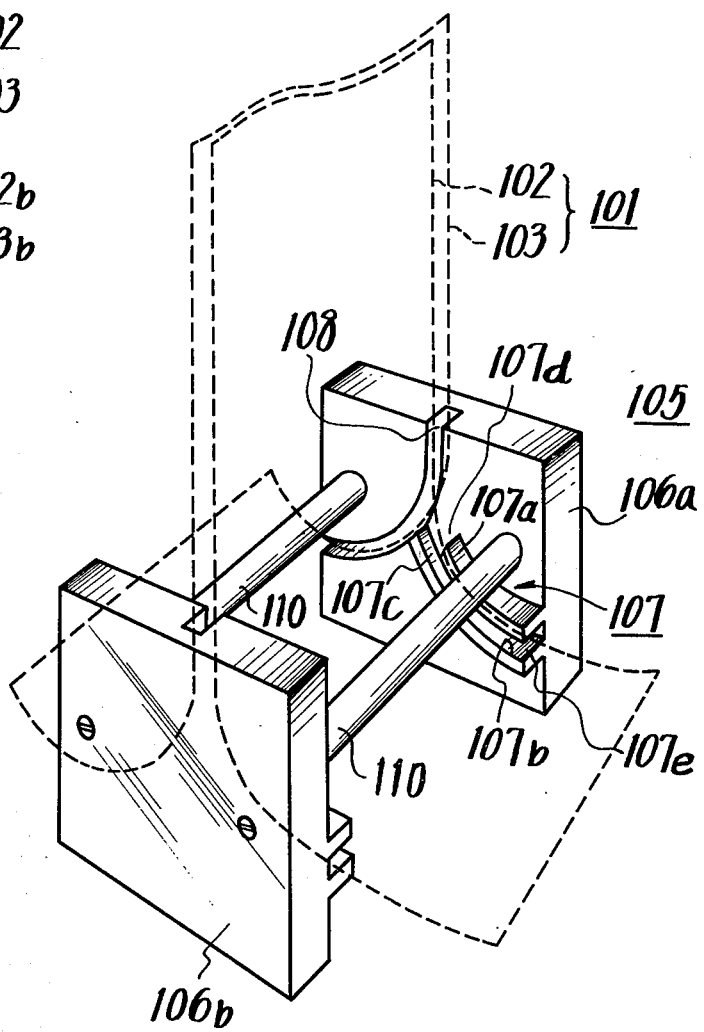
FIG. 7 is a perspective view similar to that of FIG. 2, but showing a separator device for separating the sheets of the recording sheet assembly shown on FIG. 6.

As shown on FIG. 7, a separator device 105 for separating or spreading apart sheets 102 and 103 may comprise side members 106a and 106b which are held in suitably spaced apart parallel relation by spacer rods 110, and which each have an arcuate groove 108 in the inner surface opening at the top and one side surface of the respective side member 106a or 106b. The distance between side members 106a and 106b is selected to substantially correspond to the width of the relatively narrow sheet 102, and the arcuate grooves 108 in the inner surfaces of side members 106a and 106b have depths approximately corresponding to the widths of the side edge portions 103b and 103c of sheet 103 that project laterally beyond the side edges of sheet 102. Thus, when sheet assembly 101 is slidably inserted downwardly into separator device 105, only the opposite side edge portions 103b and 103c of the relatively wider sheet 103 are received in arcuate grooves or channels 108 so that the wider sheet 103, in moving along the arcuate channels 108, is similarly curved and thereby separated from the other sheet 102 which, by reason of its flexible resilience, tends to resist curvature with the sheet 103.

In order to further separate sheet 102 from sheet 103, separator device 105 may have, on the inner surface of each of side members 106a and 106b, a curved guide 107 for further directing sheet 102 away from sheet 103 following the initial separation thereof, as described above. Each curved guide 107 may include two arcuate, parallel guide flanges 107a and 107b directed inwardly from side member 106a or 106b and defining an arcuate channel 107c between the flanges 107a and 107b. Such arcuate channel 107c opens upwardly at one end, as at 107d adjacent the respective channel 108, while the other end of channel 107c opens at a side surface of the respective side member 106a or 106b, as at 107e. With the arrangement shown on FIG. 7, when the free end portion of sheet 102 is separated from sheet 103, as described above, the side edge portions 102b and 102c of sheet 102 enter channels 107c at the open ends 107d of the latter and, thereafter, sheet 102 is guided along the arcuate channels 107c away from the oppositely curved sheet 103. Following the spreading apart or separation of the sheets 102 and 103 in separator device 105, such sheets may be guided about corresponding rotary guide drums and signal transducers or heads in the same manner as has been described above with reference to FIG. 5.

In each of the previously described embodiments of the invention, the record medium or sheet assembly 1 or 101 has included only two sheets which are either of different lengths, (FIG. 1) or of different widths (FIG. 6), and which are distinguished from each other for purposes of separation of the sheets either by such different lengths or different widths. However, as shown on FIGS. 8A and 8B, a record medium or sheet assembly 201 according to this invention may include more than two sheets, for example, flexibly resilient sheets 202 and 203 which are respectively adapted to have video signal information and audio signal information recorded thereon, and a leader sheet 205 which is relatively less flexible than the sheets 202 and 203. The ends 202a, 203a and 205a of the three sheets are secured together, as by a stopper member 204a, with the sheet 202 for recording video signal information being interposed between sheet 203 for recording audio signal information and the relatively less flexible leader sheet 205. Further, in the sheet assembly 201 the lengths $l_1$ and $l_2$ of sheets 203 and 202, respectively, are selected to be equal to each other and smaller than the length $l_3$ of the leader sheet 205, while the widths $W_1$ and $W_3$ of sheets 203 and 205 are selected to be equal to each other and substantially larger than the width $W_2$ of sheet 202. Further, in the sheet assembly 201, the magnetic coating for the recording of audio signal information is preferably applied to the inner surface of sheet 203, while the coating of magnetic material on sheet 202 for the recording of video signal information is preferably applied to the surface of that sheet 202 which faces toward leader sheet 205 in the normal, closely adjacent confronting or overlapping relation of the sheets, whereby the magnetic coatings of sheets 202 and 203 are protected.

Referring now to FIG. 9, it will be seen that a separator device 215 for use with the record medium or sheet assembly 201 includes a pair of side members 206a and 206b which are held in parallel, spaced apart relation by spacer rods 210 so that the distance between the inner surfaces of members 206a and 206b is substantially equal to the width $W_2$ of sheet 202. Each of side members 206a and 206b has, in its inner surface, a groove or channel 208 which is generally similar to the channel 8 described above with reference to the separator device 5 of FIG. 2, and which contains a pivoted sheet directing member 209 similar to the sheet directing member 9 of separator device 5 and operating similarly to separate leader sheet 205 and record sheet 203 on the basis of the relatively greater length of leader sheet 205. In addition to the channel 208 and directing member 209 for separating sheets 203 and 205, each of the side members 206a and 206b has a pair of parallel, spaced apart flange members extending vertically on its inner surface to define a channel 207f therebetween which opens, at its upper end, between beveled ends 207a and 207b of the flange members disposed adjacent the confluence of the branching channel portions 208b and 208c. Thus, when sheets 203 and 205 are separated from each other and made to follow the diverging arcuate paths defined by branching channel portions 208b and 208c, the relatively narrow sheet 202 which is not influenced by channels 208 or sheet directing members 209 resists curvature with either sheet 203 or sheet 205 by reason of the flexible resilience of sheet 202, and thus sheet 202 continues downwardly and is guided, at its opposite side edge portions, in channels 207f.

Figure 10A:
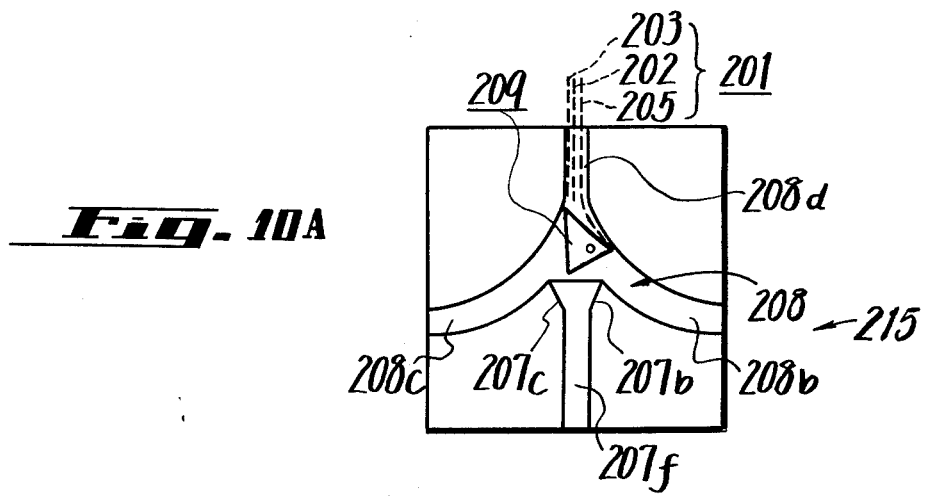
FIGS. 10A, 10B and 10C are a series of diagrammatic cross-sectional views illustrating successive stages in the operation of the separator device of FIG. 9.
Figure 10B:
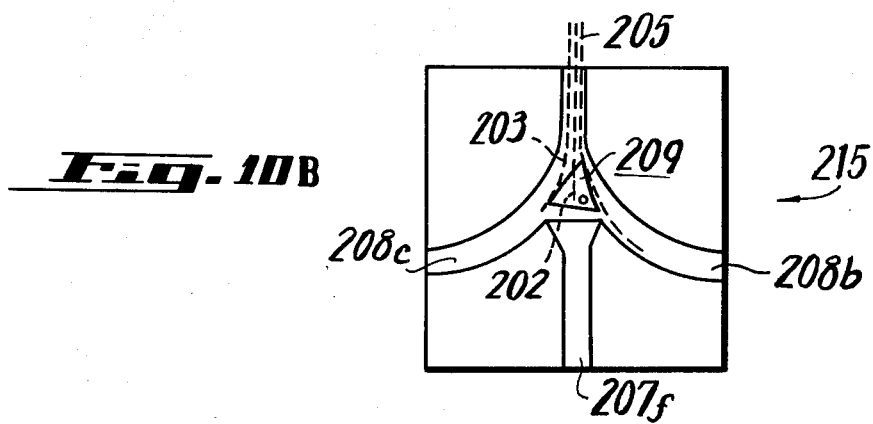
Figure 10C:
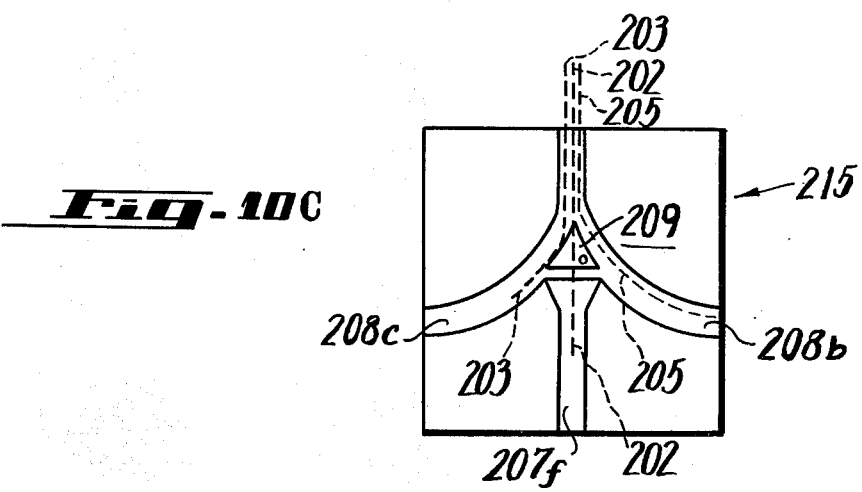

More specifically, as shown on FIG. 10A, each sheet directing member 209 is initially disposed to block the communication between the entry portion 208d and the branching portion 208c of the respective channel 208. Thus, when sheet assembly 201 is initially inserted downwardly into separator device 215, the side edge portions of sheets 203 and 205 are received in the entry portions 208d of channels 208 and the free end portion of the relatively longer sheet 205 is guided by directing members 209 into branching channel portions 208b. The movement of leader sheet 205 past directing members 209 into branching channel portions 208b causes pivoting of directing members 209 to the position shown on FIG. 10b, whereby directing members 209 peel record sheet 203 from leader sheet 205 and direct record sheet 203 into branching channel portions 208c. As sheets 203 and 205 are being thus separated, or made to diverge from each other, the flexible resilience of the intermediate record sheet 202 resists the curvature of the latter with either sheet 203 or sheet 205 so that sheet 202 continues downwardly and has its opposite side portions slidably received and guided in channels 207f (FIG. 10C).

Figure 11:
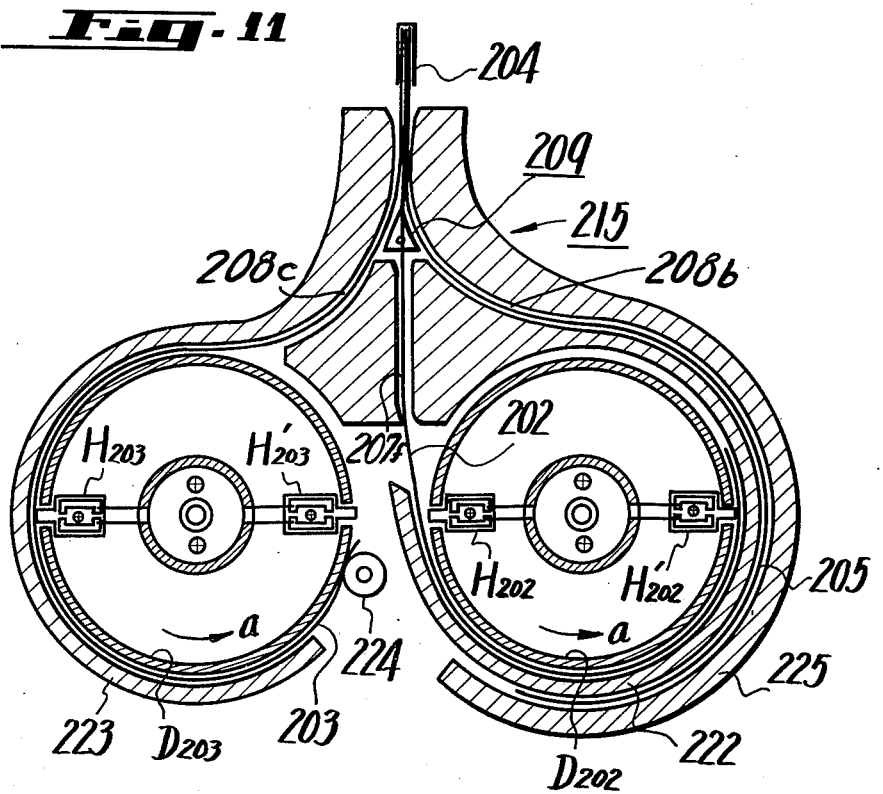
FIG. 11 is a sectional view similar to that of FIG. 5, but showing a recording and/or reproducing apparatus according to this invention which includes the separator device of FIG. 9 and is adapted for operation with a sheet assembly of the type shown on FIGS. 8A and 8B.

Referring now to FIG. 11, it will be seen that, in the recording and/or reproducing apparatus according to this invention for employing the record medium or sheet assembly 201, the record sheet 202 exiting downwardly from channels 207f of separator device 215 is directed by a sheet guide 222 in an arcuate path extending in the counter-clockwise direction about a substantial portion of the circumference of a rotary guide drum $D_{202}$ having rotary signal transducers or magnetic heads $H_{202}$ and $H'_{202}$ associated therewith. Similarly, the record sheet 203 exiting from the branching channel portions 208c of separator device 215 is directed in an arcuate path also extending in the counterclockwise direction about a substantial portion of the circumference of a corresponding rotary guide drum $D_{203}$ having rotary signal transducers or magnetic heads $H_{203}$ and $H'_{203}$ associated therewith. A pressure roller 224 may be provided, as shown, for urging the free end portion of sheet 203 against the surface of the corresponding drum $D_{203}$. The leader sheet 205 exiting from the branching channel portions 208b of separator device 215 is directed in an arcuate path in the clockwise direction about the outer surface of sheet guide 222 by means of an arcuate outer cover 225. It will be apparent that, with the arrangement of separator device 215, sheet guides 222 and 223 and outer cover 225 shown on FIG. 11, sheet 202 adapted for the recording thereon of video signal information is brought into close and crease-free contact with rotary guide drum $D_{202}$, sheet 203 adapted for the recording thereon of audio signal information is brought into close and crease-free contact with rotary drum $D_{203}$, and the relatively less flexible leader sheet 205 is extended between cover 225 and sheet guide 222 without being rumpled or damaged. With the several sheets 202, 203 and 205 being thus positioned, and with separator device 215, sheet guides 222 and 223 and cover 225 being moved, as a unit, in directions parallel to the axes of rotation of drums $D_{202}$ and $D_{203}$, it will be apparent that rotary heads $H_{202}$ and $H'_{202}$ will scan successive, parallel record tracks on sheet 202, and that rotary heads $H_{203}$ and $H'_{203}$ will similarly scan successive, parallel record tracks on sheet 203.

Referring now to FIG. 12, it will be seen that, in the recording and/or reproducing apparatus described above with reference to FIG. 11, the guide drums $D_{202}$ and $D_{203}$ are mounted on respective shafts 231 and 240 which are suitably journalled in a housing (not shown) so as to be rotatable about parallel axes while being held against axial movement relative to the housing. In order to permit the movement of the record medium or sheet assembly 201 in the direction transverse to the circular paths of travel of the signal transducers or magnetic heads associated with guide drums $D_{202}$ and $D_{203}$, separator device 215, sheet guides 222 and 223 and cover 225 are secured, as a unit, to a carriage 250 (indicated in broken lines) which is mounted on sleeves 248a and 248b that are axially slidable on support rods 238a and 238b extending parallel to the axes of the drums and being carried by respective brackets 253a and 253b.

In order to effect rotation of drums $D_{202}$ and $D_{203}$, an electric motor (not shown) suitably drives drum $D_{202}$ in the direction of the arrow a thereon and such rotation of drum $D_{202}$ is transmitted to drum $D_{203}$ by way of a relatively small diameter pulley 249 on shaft 231 driving a belt $B_1$ which runs about a relatively large diameter pulley 232 fixed on a rotatable idler shaft 233 along with a relatively small diameter pulley 251 which, in turn, drives a belt $B_2$ running about a relatively large diameter pulley 252 fixed on a rotatable idler shaft 237 axially aligned with drum shaft 240 and being adapted to be rotatably coupled with the latter through a selectively engageable and disengageable clutch $C_2$.

It will be apparent that, when clutch $C_2$ is engaged to rotatably couple idler shaft 237 with drum shaft 240, guide drum $D_{203}$ will be driven in the direction of the arrow a thereon, that is, in the same direction as guide drum $D_{202}$, but at a slower rotational speed by reason of the above described relationship of the pulleys 249 and 232 and of the pulleys 251 and 252. Thus, if the carriage 250 is moved in a direction parallel to the axes of the guide drums during such rotation of the latter, the pitch or spacing between the center lines of adjacent parallel record tracks which are successive scanned on record sheet 202 by heads $H_{202}$ and $H'_{202}$ will be smaller than the pitch or spacing between the center lines of adjacent parallel record tracks scanned on record sheet 203 by heads $H_{203}$ and $H'_{203}$.

In order to effect the movements of carriage 250, a nut 246 is fixed to the carriage and threadably engages a feed screw 247 on a shaft 234 journalled in the housing so as to extend parallel to support rods 238a and 238b while being suitably held against axial displacement. A gear 242 fixed on shaft 234 is continuously meshed with a gear 241 fixed on a rotatable idler shaft 239 which is axially aligned with idler shaft 233 and adapted to be rotatably coupled with the latter by means of an engageable and disengageable clutch $C_1$. The gear 242 on shaft 234 is further continuously meshed with a gear 243 on a rotatably mounted intermediate shaft 235, and gear 243, in turn, is continuously meshed with a gear 244 fixed on shaft 240 of drum $D_{203}$. Finally, a manually rotatable shaft 236 carries a gear 245 which is in meshing engagement with gear 244.

Figure 6:
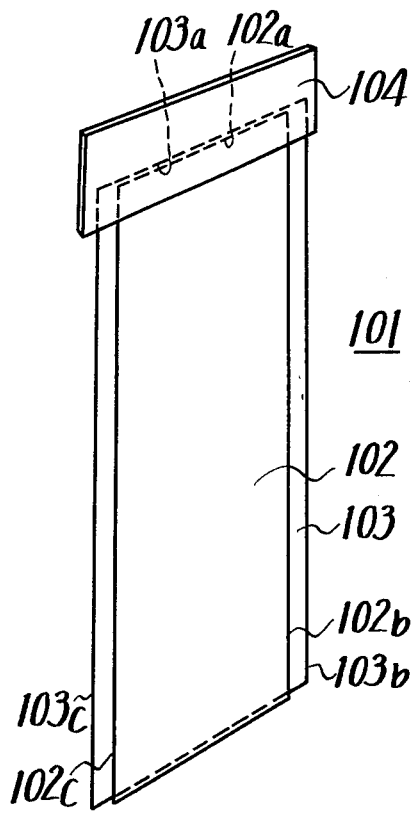
FIG. 6 is a view similar to that of FIG. 1, but showing a sheet assembly according to another embodiment of this invention.

Although the above described drive arrangement of FIG. 12 is shown incorporated in a recording and/or reproducing apparatus for employment with a record medium or sheet assembly of the type shown on FIGS. 8A and 8B, that is, in which a leader sheet 205 is provided in addition to the sheets 202 and 203 for the recording of video signal information and audio signal information, respectively, it will be apparent that a similar drive arrangement may be provided for the recording and/or reproducing apparatus of FIG. 5 which is intended for use with a two-sheet record medium, as indicated at 1 and 101 on FIGS. 1 and 6, respectively.

The recording and/or reproducing apparatus of FIG. 12 operates as follows:

RECORDING OR NORMAL PLAYBACK OR REPRODUCTION

With the record medium or sheet assembly 201 inserted in separator device 215 so that sheets 202 and 203 are in their operative positions extending about drums $D_{202}$ and $D_{203}$, respectively, as previously described, clutch $C_1$ is disengaged and clutch $C_2$ is engaged for coupling idler shaft 237 with drum shaft 240. Upon rotation of drum $D_{202}$ in the direction of the arrow a thereon, idler shaft 237 and the coupled drum shaft 240 are driven in the same direction through belts $B_1$ and $B_2$ and the associated pulleys so as to rotate drum $D_{203}$ in the same direction as drum $D_{202}$, but at a slower speed. Simultaneously, shaft 234 and feed screw 247 are rotated in the direction of the arrow a thereon from drum shaft 240 by means of the successively meshing gears 242, 243 and 244, with the result that nut 246 is moved axially in the direction of the arrow c for effecting similar movement of carriage 250, and hence of record sheets 202 and 203 relative to the drums $D_{202}$ and $D_{203}$, respectively. As a result of the foregoing movement of sheets 202 and 203, heads $H_{202}$ and $H'_{202}$ scan successive, parallel record tracks on sheet 202 for recording or reproducing video signal information in such record tracks, and heads $H_{203}$ and $H'_{203}$ similarly scan successive, parallel record tracks on sheet 203, but with a greater pitch between the adjacent tracks, for recording or reproducing audio signal information in the record tracks on sheet 203. It will be understood that the successive record tracks on sheets 202 and 203 are respectively arranged in a series extending across the respective record sheet commencing adjacent one side edge of the record sheet and ending adjacent the opposite side edge of the record sheet. Thus, at the commencement of the recording or normal reproducing operation, carriage 250 is disposed so that the circular paths of travel of the signal transducers or heads associated with drums $D_{202}$ and $D_{203}$ will be adjacent one side edge of sheets 202 and 203, respectively, and movement of nut 246 and carriage 250 in the direction of the arrow c has the effect of relatively moving the circular paths of travel of the signal transducers or magnetic heads toward the opposite side edges of the record sheets.

RETURN OR REVERSE PLAYBACK OPERATION

At any time when it is desired to effect reverse playback or reproduction of recorded video signal information, or when it is desired to return carriage 250 to its original or starting position, for example, upon the completion of a recording or normal reproducing operation, clutch $C_1$ is engaged and clutch $C_2$ is disengaged. As a result of the foregoing, idler shaft 239 and gear 241 are driven from idler shaft 233 so as to effect rotation of gears 241 and 242 in the direction of the arrows $b$ on FIG. 12 and, accordingly, nut 246 and carriage 250 are driven by screw 247 in the direction opposed to that indicated by the arrow $c$.

STILL MOTION AND SLOW MOTION REPRODUCTION

At any time during a playback or reproducing operation of the apparatus, both clutches $C_1$ and $C_2$ may be simultaneously disengaged with the result that the driving of feed screw 247 from either idler shaft 239 or drum shaft 240 is interrupted. With both clutches $C_1$ and $C_2$ disengaged, shaft 235 may be manually rotated to drive feed screw 247 through meshing gears 242 and 243 so that carriage 250 can be manually displaced either to select a record track on sheet 202 which is to be repeatedly scanned by heads $H_{202}$ and $H'_{202}$ on drum $D_{202}$ for still motion reproduction of an image or picture represented by the corresponding video signal information recorded in such record track. Of course, if shaft 235 is manually rotated continuously at a relatively slow speed, the effect thereof will be to cause relatively slow movement of carriage 250 for achieving corresponding slow motion reproduction of the recorded video signal information.

Referring now to FIG. 13A, it will be seen that a record medium or sheet assembly 201' according to another embodiment of this invention, and which may be advantageously employed in the recording and/or reproducing apparatus described above with reference to FIGS. 11 and 12, may include, in addition to record sheets 202 and 203 and leader sheet 205 which are similar to the correspondingly numbered sheets of the record medium 201 on FIGS. 8A and 8B, a second video record sheet 202' and a second audio record sheet 203'. The record sheets 202' and 203' are similar to the record sheets 202 and 203, respectively, but are arranged in order at the opposite side of leader sheet 205, with all of the sheets of record medium 201' being secured together at one end by means of the stopper member 204'.

If the record medium or sheet assembly 201' is inserted into entry portions 208d of channels 208 in separator device 215 with sheets 202 and 203 at the side of leader sheet 205 facing toward branching channel portions 208c, as in FIG. 13B, then record sheet 202 is directed downwardly by channels 207f and record sheet 203 moves along branching channel portions 208c, with leader sheet 205 and record sheets 202' and 203' being directed along branching channel portions 208b. Thus, as before, record sheets 202 and 203 will be directed by sheet guides 222 and 223 about drums $D_{202}$ and $D_{203}$, respectively, while leader sheet 205 and record sheets 202' and 203' will be accommodated between cover 225 and sheet guide 222. However, if the position of record medium or sheet assembly 201' is reversed, that is, if sheet assembly 201' is inserted in separator device 215 with sheets 202' and 203' at the side of sheet leader 205 facing toward branching channel portions 208c, then sheets 202' and 203' are guided about drums $D_{202}$ and $D_{203}$ while leader sheet 205 and record sheets 202 and 203 are received between cover 225 and sheet guide 222. Accordingly, record medium 201' can record and playback or reproduce video and audio signals for an increased playing time, first in one position and then in the opposite position.

Referring now to FIGS. 14A and 14B, it will be seen that, with sheets 202 and 203 extending about the circumferences of drums $D_{202}$ and $D_{203}$, respectively, over an angular extent of at least 180°, and with the video recording heads $H_{202}$ and $H'_{202}$ moving at a predetermined speed in the plane of their rotation as indicated by the arrow $e$ (FIG. 14A) and the audio recording heads $H_{203}$ and $H'_{203}$ moving at a predetermined speed in their plane of rotation as indicated by the arrow $f$ (FIG. 14B), while both sheets 202 and 203 are simultaneously moved, at the same speed, transversely to the planes of rotation of the respective heads, as indicated by the arrows $d$, then heads $H_{202}$ and $H'_{202}$ will alternately scan sheet 202 along parallel, successive tracks arranged in a series across the width of sheet 202, as at $T_1$, $T_2$ and $T_3$. Such record tracks will be inclined relative to the opposed side edges of sheet 202, with the inclination of the tracks and the pitch $P_1$ thereof being determined by the relationship of the speed of movement of $H_{202}$ and $H'_{202}$, indicated by the arrow $e$, and the speed of movement of the sheet transverse to the plane of rotation of the heads, as indicated by the arrow $d$. Similarly, the audio recording heads $H_{203}$ and $H'_{203}$ will alternately scan the respective sheet 203 along successive, parallel record tracks which are arranged in a series across the width of sheet 203, as indicated at $t_1$, $t_2$ and $t_3$, which tracks are inclined relative to the opposite side edges of sheet 203 with the inclination of the tracks and their pitch $P_2$ being determined by the relation of the speed of rotational movement of heads $H_{203}$ and $H'_{203}$, as indicated by the arrow $f$ and the speed of movement of sheet 203 transverse to the plane of rotation of those heads, as indicated by the arrow $d$.

It will be apparent that, if video signals are applied to heads $H_{202}$ and $H'_{202}$ and audio signals are applied to heads $H_{203}$ and $H'_{203}$ during the described scanning of sheets 202 and 203 by such heads, video and audio signal information will be recorded in the tracks $T_1$, $T_2$, $T_3$, etc. on sheet 202 and in the tracks $t_1$, $t_2$, $t_3$, etc. on sheet 203, respectively.

Preferably, in the apparatus according to this invention, the heads $H_{202}$ and $H'_{202}$ for recording and reproducing video signal information are each provided with an air gap $g_V$ having a width D (FIG. 14A) which is substantially larger than the pitch $P_1$, that is, the distance through which the sheet 202 is moved in the direction of the arrow $d$ during the rotation of each of heads $H_{202}$ and $H'_{202}$ through 180°. As a result of the foregoing, and as shown particularly on FIG. 15, after one of the heads $H_{202}$ and $H'_{202}$ has recorded video signal information in a track $T_n$ having a width D, the other head $H'_{202}$ or $H_{202}$ records video signal information in the next track $T_{n+1}$ which also has the width D, but which overlaps and erases a portion of the previous track $T_n$ so as to effect so-called overlap writing. Accordingly, the successive tracks $T_1$, $T_2$ and $T_3$ in which video signals are recorded each have an effective width equal to the pitch $P_1$ which is substantially less than the gap width D of the heads $H_{202}$ and $H'_{202}$. Since there are no gaps or guard bands between the successive record tracks $T_1$, $T_2$, $T_3$, etc. for the recording of the video signal information, it will be apparent that the utilization of the area of record sheet 202 for the recording of the video signal information is enhanced.

Since the preferred apparatus according to this invention rotates the audio recording and reproducing heads $H_{203}$ and $H'_{203}$ at a slower speed than the heads $H_{202}$ and $H'_{202}$, it will be apparent that the inclination of the audio record tracks $t_1$, $t_2$, $t_3$, etc. and the pitch $P_2$ between adjacent audio record tracks will be greater than the inclination and pitch, respectively, of the video record tracks. In any case, the width of the air gap $g_A$ of each of the heads $H_{203}$ and $H'_{203}$ for recording and/or reproducing the audio signal information is selected to be substantially smaller than the pitch $P_2$ so that the audio record tracks will be formed on record sheet 203 with substantial spaces therebetween, as shown on FIG. 14B.

When the video signal information being recorded and reproduced corresponds to that of a standard television picture signal having sixty fields, or thirty frames, per second, the drum $D_{202}$ and associated heads $H_{202}$ and $H'_{202}$ are preferably rotated at a speed of thirty revolutions per second, so that each of the record tracks $T_1$, $T_2$, $T_3$, etc. will contain video signal information corresponding to a single television picture field. The heads $H_{202}$ and $H'_{202}$ are substantially diametrically opposed on drum $D_{202}$, but with the angular distance therebetween deviating from 180° by an angle corresponding to 0.5H (in which H represents one horizontal period of the standard video signal). By reason of the foregoing, and as shown on FIG. 14A, the recording positions $P_H$ of the horizontal synchronizing signals in the successive record tracks are arranged on straight lines extending parallel to the direction of the air gaps $g_V$ of heads $H_{202}$ and $H'_{202}$. The heads $H_{203}$ and $H'_{203}$ for recording and reproducing the audio signal information may be angularly spaced apart on drum $D_{203}$ by precisely 180°, and may be rotated at a relatively slow speed, for example, at a speed of five revolutions per second in the case where heads $H_{202}$ and $H'_{202}$ are being rotated at a speed of 30 revolutions per second.

In the recording and/or reproducing apparatus according to this invention, the signal actually recorded by heads $H_{202}$ and $H'_{202}$ is preferably obtained by employing the video signal to phase modulate a suitable carrier, for example, as disclosed in detail in U.S. patent application Ser. No. 425,845, filed Dec. 18, 1973, and having a common assignee herewith, while the signal recorded by the heads $H_{203}$ and $H'_{203}$ is obtained by conventionally superposing a biasing signal on the audio signal. Thus, as shown on FIG. 16, in the apparatus according to this invention, a video signal supplied to an input terminal 301 is applied from the latter to a phase modulator 302 in which the video signal phase-modulates a carrier which is supplied from an oscillator 303. The resulting phase-modulated signal is supplied through a recording contact R of a recording-reproducing switch 304 to heads $H_{202}$ and $H'_{202}$.

In the foregoing arrangement, the oscillator 303 for providing the carrier to be phase-modulated by the video signal is suitably synchronized with the rotation of heads $H_{202}$ and $H'_{202}$ so that the phases of the carriers $J_o$ to be modulated, indicated in broken lines on FIG. 17, in the successive tracks $T_{n-1}$, $T_n$, $T_{n+1}$, — are aligned in the directions parallel to the direction of the air gaps $g_V$ of heads $H_{202}$ and $H'_{202}$. Further, the modulation index of the phase modulation, which is expressed as a radian corresponding to the phase deviation of the modulated carrier relative to the unmodulated carrier, is selected to be relatively small, for example, less than about 1.0 so that the side band components of the second and higher order signals become sufficiently small and can be neglected.

Returning to FIG. 16, it will be seen that the audio signal is applied to an input terminal 305 from which it is supplied through an amplifier 306 and equalizer 307 to a recording contact R of a recording-reproducing switch 308. The output of equalizer 307 has superposed thereon a bias signal from an oscillator 309 and, during recording, the resulting signal is supplied from switch 308 to heads $H_{203}$ and $H'_{203}$.

For reproducing or playback operation of the apparatus, switches 304 and 308, which are indicated to be ganged, are changed over to engage the respective reproducing or playback contacts P while heads $H_{202}$ and $H'_{202}$ and heads $_{203}$ and $H'_{203}$ are rotated in the same manner as described above for recording operation and sheets 202 and 203 are moved in the direction parallel to the axes of the rotary heads also in the same manner as for recording operation. The reproduced output from heads $H_{202}$ and $H'_{202}$ is supplied through contact P of switch 304, a reproducing or playback amplifier 310 and a limiter 311 to a demodulator 312 which supplies its demodulated output or video signal to an output terminal 313. The reproduced output from heads $H_{203}$ and $H'_{203}$ is supplied through contact P of switch 308, an equalizer 314 and a reproducing or playback amplifier 315 having its output connected to terminal 316 for providing a reproduced audio signal at such output terminal.

Since heads $H_{202}$ and $H'_{202}$ for reproducing the recorded video signals each have an air gap $g_V$ with the width D thereof being substantially larger than the pitch $P_1$ or effective width of the successive record tracks on sheet 202, each of the heads $H_{202}$ and $H'_{202}$ is effective, during reproducing or playback operation, to scan more than one of the record tracks, for example, the record track $T_n$ and portions of the adjacent record tracks $T_{n-1}$ and $T_{n+1}$, as shown on FIG. 17. However, by reason of the use of phase modulation in recording the video signal, the demodulated reproduced signal obtained at output terminal 313 is substantially equivalent to the composite signal that would result from combining the original video signals corresponding to the respective tracks $T_n$, $T_{n-1}$ and $T_{n+1}$ with a predetermined level ratio therebetween corresponding to the position of the reproducing head relative to the record tracks in the direction across the latter, with the result that no beat interference is produced. Even if the scanning head $H_{202}$ or $H'_{202}$ is shifted relative to the track $T_n$, for example, in the direction toward the adjacent track $T_{n-1}$ or in the direction toward the other adjacent track $T_{n+1}$, no beat interference due to cross-talk between adjacent tracks is generated, and hence a socalled tracking servo system is not required for the reproducing or playback operation of the apparatus.

In the foregoing description of illustrative embodiments of this invention, reference has been made repeatedly to the recording and reproducing of "video" signals, which term, of course, includes monochrome as well as color television signals, but is further intended to include any other types of signals which, when applied to a cathode ray tube or the like, are effective to produce a visual image or picture.

It is further to be noted that while magnetic recording and reproducing of the signals is preferred, as in the illustrative embodiments of the invention described above, other recording and reproducing methods may be employed. For example, in place of a magnetic record medium, the record medium may be constituted by a thin plastic foil in which grooves of varying depth are formed to constitute the record tracks having video or audio signals recorded therein, with such recorded signals being reproduced by a diamond or other stylus moving along the successive record tracks and associated with a piezo-electric ceramic transducer or the like by which the resulting variations in the pressure on the pickup stylus are converted to a corresponding electrical signal. The invention can also be applied to the electro-optical recording and reproducing of video and audio signals, for example, in which the successive record tracks on the record medium have variations in either light reflectivity or transmission in correspondence to the signals recorded therein. The invention can be further applied to the capacitive recording and reproducing of video and audio signals, for example, to an apparatus in which the record medium is constituted by a vinyl base sheet having a coating of aluminum or copper thereon and a dielectric coating, for example, of polystyrene, superposed on the aluminum or copper coating, in which case the video or audio signals are recorded as variations in the capacitance along the successive record tracks. When reproducing such video or audio signals, the variations in capacitance between the electrode of a pickup head moving along the record tracks in succession and the aluminum or copper coating of the record medium are employed to produce an output signal corresponding to the original video or audio signals which were recorded. Finally, while it is preferred to record the video signal as a phase-modulated signal without guard bands between adjacent record tracks, so as to enhance the utilization of the record medium without encountering beat interference between signals reproduced from adjacent tracks and without requiring the use of a tracking servo system during reproducing or playback operation, the invention can also be applied to an apparatus in which the video signal is recorded as a frequency-modulated signal.

Although specific embodiments of the invention have been described above with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An apparatus for recording and/or reproducing at least video signal information on a sheet assembly including at least two flexibly resilient sheets kept oriented and aligned with respect to each other and normally disposed in closely adjacent, confronting relation, said apparatus comprising: separator means for receiving said sheet assembly and separating only a substantial portion of each of said sheets from the other of said sheets; a guide drum; guiding means for receiving the separated portion of one of said sheets from said separator means and guiding said separated portion of said one sheet in an arcuate path about at least a portion of the circumference of said drum; rotary signal transducer means associated with said guide drum for movement in a circular path substantially coinciding with said circumference of the drum; and means for moving said sheet assembly and said rotary signal transducer means relative to each other in a direction transverse to said path of the rotary signal transducer means so that the latter scans successive parallel record tracks on said separated portion of said one sheet disposed in said arcuate path.

2. An apparatus according to claim 1 in which said portion of said one sheet has an edge offset from an adjacent edge of said other sheet, and said separator means comprises means to intercept differentially and to direct in different directions said offset edges of said sheets for separating said portions thereof from each other.

3. An apparatus according to claim 2 in which said sheets are held together at mutual attachment regions adjacent one of the ends of said sheets remote from said offset edges located at the other ends of said sheets received in said separator means, said guiding means comprising at least two sheet-directing passages, one of said paths being curved away from the other so that said substantial portions of the sheets are separated by spreading apart the sheets at said other ends.

4. An apparatus according to claim 3 in which said sheet assembly further includes fastener means joining said sheets together at said mutual attachment regions adjacent said one ends thereof for permanently holding the sheets together.

5. An apparatus according to claim 3 in which said sheets are oblong and have different lengths so that the longer one of said sheets projects beyond another of said sheets in the longitudinal direction of the sheets and said offset edges are offset from each other in the longitudinal direction of said sheets at said other ends of the sheets.

6. An apparatus according to claim 5 in which said separator means includes means defining channels for respectively slidably receiving the opposite side edge portions of said sheets, each of said channels including an entry portion for the introduction thereinto of the respective side edge portions of said sheets at said other ends of the sheets and branching portions that diverge from said entry portion, and a directing member movably mounted adjacent the confluence of each of said channels between said entry and branching portions of the respective channel for initially directing the respective offset edge portion of said longer sheet to cause the side edge portions of said longer sheet to travel along one of said branching portions, said directing member being deflected by said offset edge portion of said longer sheet to an alternative position in the path of said offset edge portion of said other sheet to cause the side portions of said other sheet to travel along the other of said branching portions.

7. An apparatus according to claim 6 in which said directing member is of substantially triangular cross-sectional configuration and has an apex and opposite flanks leading from said apex, and said directing member is pivotally mounted with said apex extending into said entry portion and normally bearing against the side of said entry portion remote from said one branching portion and with one of said flanks normally projecting into said one branching portion so that said apex initially directs said other end of the longer sheet into said one branching portion where it acts against said one flank to pivot said directing member to move said apex against the surface of said longer sheet, whereupon, said apex acts to direct said other end of said other sheet into said other branching portion.

8. An apparatus according to claim 3; in which said sheets have different widths and are laterally positioned relative to each other so that the wider one of said sheets projects laterally beyond another of said sheets at the opposite sides of the latter.

9. An apparatus according to claim 8; in which said separator means includes means defining channels for respectively slidably receiving the opposite side edge portions of said wider sheet which project laterally beyond said other sheet so that only said wider sheet is constrained to follow a path defined by said channels, and said channels have curved portions so that said wider sheet, in moving along said arcuate portions of the channels, is similarly curved and thereby separated from said other sheet which, by reason of its flexible resilience, tends to resist curvature with said wider sheet.

10. An apparatus according to claim 1; in which at least said one sheet has a coating of magnetic material thereon for the magnetic recording of said video signal information thereon, and said rotary signal transducer means is electro-magnetic.

11. An apparatus according to claim 1; in which said guide drum is rotatable with said signal transducer means, and the latter includes at least a pair of transducer members mounted at substantially diametrically opposed locations in respect to said drum.

12. An apparatus according to claim 1; in which another of said sheets is adapted to have audio signal information recorded thereon; and further comprising a second guide drum parallel with the first mentioned guide drum at an axially fixed position relative to the latter and having second rotary signal transducing means associated with said second guide drum for movement in a circular path substantially coinciding with the circumference of said second guide drum, and guiding means associated with said second guide drum for receiving the separated portion of said other sheet from said separator means and guiding said separated portion of said other sheet in an arcuate path about at least a portion of said circumference of the second drum so that the relative movement of said sheet assembly and said rotary signal transducer means in said direction transverse to the path of the rotary transducer means causes said second rotary signal transducer means to scan successive parallel record tracks on said separated portion of said other sheet disposed in said arcuate path about said second drum.

13. An apparatus according to claim 12; further comprising drive means for rotating said second rotary signal transducer means at a substantially slower speed than the first mentioned rotary signal transducer means so that said record tracks scanned by said second transducer means have a greater pitch than said record tracks scanned by said first transducer means.

14. An apparatus according to claim 12; in which said first and second guide drums and the associated rotary transducer means are fixed in the axial directions of the respective drums; and in which said separator means and said guiding means associated with said first and second drums are movable, as a unit, in directions parallel to said axial directions of the drums for effecting said relative movement of said sheet assembly and said rotary transducer means associated with both of said drums.

15. An apparatus according to claim 1; in which said guide drum and the associated rotary signal transducer means are fixed in the axial direction of said drum, and said separator means and guiding means are movable, as a unit, in directions parallel to said axial direction of the drum for effecting said relative movement of said sheet assembly and said rotary transducer means.

16. An apparatus according to claim 15; further comprising drive means for rotating said drum and said rotary transducer means, and transport means driven from said drive means for effecting the movement of said separator means and guiding means, as a unit, and including disengageable clutch means so that said rotary transducer means may continue to rotate while said separator means and guiding means are at rest to cause said rotary transducer means to repeatedly scan a selected one of said record tracks.

17. An apparatus according to claim 1; in which another of said sheets is less flexible than said one sheet so as to constitute a leader for said sheet assembly in entering said separator means.

18. An apparatus according to claim 17; in which said other sheet is adapted to have signal information recorded thereon.

19. An apparatus according to claim 1; in which said one sheet has a coating of magnetic material on a surface thereof which faces, and is therefore protected by, another of said sheets when in said normal, closely adjacent confronting relation, and said rotary transducer means is electro-magnetic for magnetically recording and/or reproducing the video signal information in said coating.

20. An apparatus according to claim 1; in which each of said two sheets is adapted to have video signal information recorded thereon, and said sheet assembly further includes at least a third sheet which is interposed between said two sheets and functions as a leader; and in which said separator means includes first channel-defining means leading to said guiding means for receiving the one of said two sheets at one side of said leader, and second channel-defining means diverging from said first channel-defining means for receiving said leader and the other of said two sheets so that said two sheets adapted to have video signal information recorded thereon are selectively disposable in said arcuate path about said drum in dependence on the direction in which said sheet assembly is inserted in said separator means.

* * * * *